US008600810B2

(12) United States Patent
Pen

(10) Patent No.: US 8,600,810 B2
(45) Date of Patent: Dec. 3, 2013

(54) EXPANDING COMPUTER DISPLAY ADVERTISING METHOD CONTINUATION

(71) Applicant: The Pen, West Hollywood, CA (US)

(72) Inventor: The Pen, West Hollywood, CA (US)

(*) Notice: Subject to any disclaimer, the term of this patent is extended or adjusted under 35 U.S.C. 154(b) by 0 days.

(21) Appl. No.: 13/738,603

(22) Filed: Jan. 10, 2013

(65) Prior Publication Data
US 2013/0124345 A1 May 16, 2013

Related U.S. Application Data

(63) Continuation of application No. 10/833,971, filed on Apr. 28, 2004, now Pat. No. 8,396,745.

(51) Int. Cl.
G06Q 30/00 (2012.01)
(52) U.S. Cl.
USPC ...................................... 705/14.43
(58) Field of Classification Search
USPC ........................................... 705/14
See application file for complete search history.

(56) References Cited

U.S. PATENT DOCUMENTS

| 5,937,417 | A  | * | 8/1999 | Nielsen ......................... 715/207 |
| 7,003,734 | B1 | * | 2/2006 | Gardner et al. ............... 715/808 |
| 2001/0025274 | A1 | * | 9/2001 | Zehr et al. ..................... 705/402 |
| 2002/0095330 | A1 | * | 7/2002 | Berkowitz et al. ............. 705/14 |

* cited by examiner

Primary Examiner — Alvin L Brown

(57) ABSTRACT

A method and system is disclosed for creating additional advertising space by sensing the position of an element on a web page or other client viewer, and upon interaction of a user with that element positioning the appearance of additional web page elements not limited by the boundary of the initial element. Marketing methods enabled thereby are disclosed where among other possibilities this created advertising space can be sold to pay for placement of instances of the invention, where licensees are motivated to themselves place instances of the invention in exchange for usage rights, or further be compensated with a share of income from built-in links, where instances of the invention can carry value added content so that hosting sites will pay for the placement or carry it at no charge, and where a content provider might pay for having its content programmed or provide it for free for promotional value, where instances of the invention maintain links back to a generator site for its own propagation, where a web presence can be created across multiple sites for any commercial or social purpose as a conglomerate world wide billboard, where any instance of the invention can be reconfigured on any site where it resides in real time protected by optional password, and other alternatives more fully described in the specification.

20 Claims, 5 Drawing Sheets

EXPANDING COMPUTER DISPLAY ADVERTISING METHOD CONTINUATION

CONTINUATION APPLICATION

This specification is a continuation application of U.S. patent application Ser. No. 10/833,971, filed on Feb. 28, 2004, and allowed on Oct. 15, 2012. This application is intended to be filed prior to payment of the allowance fee due for the prior application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyright rights whatsoever.

COMPUTER PROGRAM LISTINGS

CODE 1: is a block of html and javascript tags which may launch a specific embodiment of the present invention, the code for which is listed after the abstract of this specification CODE 2: is a javascript computer code file which defines the behavior of a specific embodiment of the present invention, the code for which is listed after the abstract of this specification.

CODE 3: is a java computer code file which is the source code for generating the java applet for a specific embodiment of the present invention, submitted for the original application on a separately submitted CD-ROM as a computer program listing appendix, but reproduced verbatim below.

CODE 4: is a block of javascript code which references the java applet which would be compiled from the code in CODE 3 for a specific embodiment of the present invention, submitted for the original application on a separately submitted CD-ROM as a computer program listing appendix, but reproduced verbatim below.

BACKGROUND

The potential for commercial promotion of products and services on the internet has created value in the form of advertising space on any web page that receives a significant number of visitors (known as "traffic" or "hits"). The primary source of traffic for all websites are links. These are graphic elements which are either lines of text (usually underlined and known as "text links") which when clicked by the mouse load the target web page in the website browser window, or image elements (known as "buttons") which act in the same way. As a form of advertising, buttons are comparable to display ads in more traditional publishing mediums, and are generally more desirable than text links because of their increased prominence.

Because of the limitation on the amount of page area available on a particular web page, there is premium on that space, based on size. A larger size graphic image, for which one standardized size is 468 pixels wide by 60 pixels high, is known as a "banner" and hosting websites generally place a high premium on them or severely limit their availability so as not to totally dominate the layout space of their pages. Some sites create subordinate "links" pages where such ads are essentially buried because relatively few visitors to their websites ever bother to visit these pages. The goal therefore is to get the maximum exposure in the screen area first visible on one of the initial web pages (known as "front pages") that load when a particular website is visited, resulting in exposure to the maximum of that website's traffic.

Websites which receive a very high volume of traffic are often referred to as "portal" websites. One button placed on such a site is of great value because of the exposure it gets on that one page. However, conceivably the same impact might be achieved by placing the same button on many multiple less lower volume pages. It is therefore a desirable consideration for buttons to be compatible with any page where they may be placed and not to cause problems because of any code associated with them.

One method which has been used to force visitors to visit an advertiser web page is to spawn a new browser window (known as a "pop-up") which then loads promotional web pages. That is a method which has fallen into great disrepute, as it has been used to create visitor traps which trigger an endless series of new windows. As fast as one can be closed additional windows are generated until either the visitor submits to proceeding along a predetermined path, or until the browser software itself overloads and crashes. Websites which rely on such techniques are now routinely banned from many web pages because of the complaints they create. Visitors to a web page cherish their power to determine for themselves what will appear on their computer screens by their own actions. They greatly dislike anything that requires extra effort to control, even if it means only a single click to close an unwanted function, or if there is any delay involved in moving on.

It is submitted that a new technique to increase one's visibility on a web page without demanding additional layout screen space would be of immense commercial value. The method described herein instructs one skilled in the art of programming how to create a graphic element which expands in size upon a mouseover event to a clickable array with one or more options, and then gracefully disappears when the mouse leaves that screen area (the "mouseout"), with a unique combination of features which are more fully described below. The net effect is to create new advertising space with commensurate tangible value which would not otherwise exist, increasing the chance of getting this exposure on the front page of another website.

The great challenge in widely deploying such a system is that one cannot always predetermine exactly what position one's submitted advertising button will appear on the website of another. Given full control over one's own web page programming, one skilled in the art may create graphics which expand into other graphics upon mouseover. But such systems generally require the website host programmer to predetermine in which relative direction the new graphic areas will appear in relation to the initial mouseover graphic depending on its placement. If one were to deploy a button that on mouseover always caused a new graphic to appear below it, that new graphic would appear off the computer screen if the button were positioned at the bottom edge of a page on a website to which it was submitted.

The situation is further complicated by the fact that different website browsers (Internet Explorer, Netscape, Mozilla, etc.) and their many sub-versions require different code to achieve the same effect. This means one would have to execute different code on a viewing website browser depending on its sub-type, what is referred to as "cross-browser" compatibility. One of the most divergent areas of browser specific webcode is related to the sensing of the position of elements on a web page. To broadly implement a system as envisioned by this invention would require inventing a universal method of determining the position of a submitted button not only in relation to its initial visible position, but also to account for the shifts in position as a page was scrolled, and to modify the behavior of button accordingly.

For all the foregoing reasons, there is a need for a method for creating a drop in module of computer code, which can sense it's own position on any web page or subpage where it appears, and spawning on mouseover additional graphics outside of its initial boundaries, in such a way that the new graphics will always appear fully on screen, and where those new graphic areas may be sold as linkable space to advertisers, and submitted to multiple websites for maximum impact without compatibility concerns.

SUMMARY

The present invention is directed to fulfilling this need. An expanding computer display method and system is disclosed whereby a visible element, either an image or line of text, may be placed by another webmaster anywhere on any web page or divided frame of such a web page. It includes associated with it a reference to a computer code file which may be external to the code of the web page itself, which is then automatically loaded when the web page is viewed. When a mouse is positioned over the present invention it first detects it's own positioning co-ordinates. This is done either directly based on a unique id assigned to the image, or based on an invisible image positioned adjacent to the line of text if that is the element initially visible. The sensed position of the element is adjusted for the scrolling position of the page and a secondary graphic element or array of graphic elements appears either above or below, or to the left or right, of the initial element depending on what position would be most optimum.

Each of these secondary elements may link to the same or different advertisers, and each of these elements can further spawn other elements and arrays in the same manner, creating multi-level advertiser menus by category. Any kind of code which might appear on a web page may be contained in the arrays, including streaming audio and video, creating web pages within the web pages where they reside. When the mouse is no longer positioned over one of the elements it may gracefully disappear again, or require an affirmative click to do so.

Because the invention requires no special coding consideration from the webmaster to whom it is submitted, a single implementation may appear simultaneously on a large number of websites creating in effect conglomerate advertising space, acting as virtual portal websites. In various embodiments, the income generated by these links can be shared with the webmasters who host them, or with the advertisers themselves who place instances of the invention with those webmasters, as well as with the owner of the technology who may also collect a base advertising fee himself, or use part of that income to buy web page space for these elements. If streaming video or audio content were included in the package, one might even get other webmasters to pay a fee to be allowed to host an instance of the invention.

In a further anticipated embodiment the invention can be self-promoting by linking one of its elements back to a site where further instances of the invention can be created to order. By assigning unique ids and passwords to the various advertisers and their embodiments, the advertisers themselves can be empowered to access the control server which holds the computer code file with the specifications of different instances of the invention. This means that the graphics of the invention and even the links associated with those graphics or any other feature can be instantaneously changed in real time throughout cyberspace anywhere they are placed and displayed.

The realm of configurational possibilities opened up by the instant technology limited only by the imagination of one skilled in the art. These and other features, aspects and advantages of the present invention will become better understood with regard to the following detailed description, appending claims and drawings:

DETAILED DESCRIPTION

Figure 1:
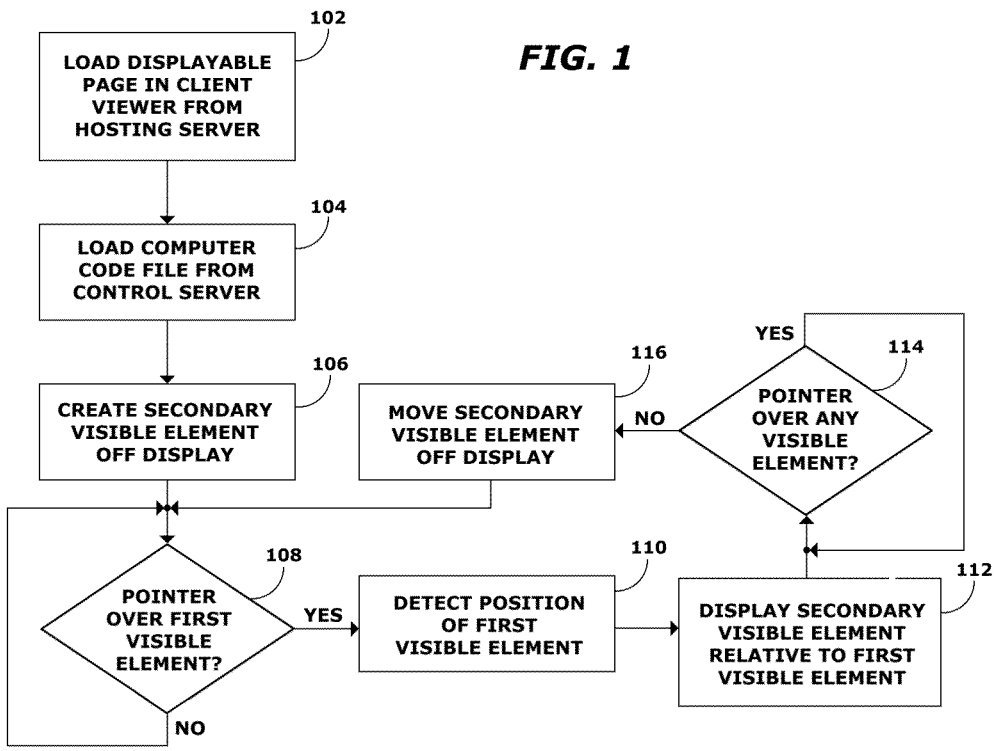
FIG. 1 is a flow diagram illustrating the steps executed in the functioning a specific embodiment of the present invention

To best understand the terms used in the claims, they should be defined as they are intended to be used there. While the present invention clearly has enormous potential for remaking the landscape of the internet in particular, is must be recognized that with the advent of personal digital assistants, set-top boxes, and other configurations to come in the future, this technology would be equally applicable to any computer display appliance with a directable control device. As used in the claims, "computer display" is intended to refer to any screen display device capable of rendering graphic images or text in a positional context, where items on the screen may be selected by position. The word "element" refers to any image, graphic or segment of text visible or not on such a display as generated by the code associated with a displayable page, where a "page" is the content of the computer display at a point in time.

A "hosting server" would most generally be a website on the internet, but would also apply to any communication device which can transmit and receive binary or text computer code, whether local or remote. So too would a "control server" refer to either the same or another like server with the same capabilities. A "computer pointing device" would include as possibilities a mouse, a stylus, light pen, touch screen, button, key or any other device which could select an area of a screen display by position. A "client viewer" means not only a web browser which may load web pages over the internet, but also any other device with a computer display as defined above which may be used in commerce with like properties.

A "computer code file" is a executable block of script or other code which may control the behavior of a displayable page, whether upon loading or thereafter in response to some user interaction, whether loaded separately or incorporated into the code of the page itself. A "link" in addition to its familiar use as an executable feature to load or to go to another displayable page also is intended to include any connection or act of recognition an advertiser would want to create in the mind of the user of a client viewer, including an otherwise inactive display element identified with that advertiser. The word "content" refers to pictures, text, video, audio or any other kind of digitally stored material which might be of value or interest to a user accessing a client viewer. And a "content provider" refers to any entity which may provide the usage rights to use content in the context of such a client viewer. As used in the context of the claims, "nested" means providing for additional visible elements to appear on mouseover of elements which only have appeared in response to the mouseover of another element.

As already stated, a key technical hurdle in implementing the present invention was developing a method of element position detection which would work over a wide variety of internet browser types and web page structures. The desired method would have to work whether in the top frame of a web page or in some divided part of a web page within a divided frame set. Furthermore, there are three different models of how new divisions of computer html screen areas may be defined once they can be located, the document.all method of Internet Explorer, the document.getElementById method of Netscape and Mozilla, and the document.layers model of the earlier Netscape 4. One skilled in the art of javascript and html programming would be familiar with these concepts and acknowledge the difficulty of the task of creating such cross-browser code. It would not be considered sufficient to settle on a solution that would only work with a particular species of web browser or only under some circumstances.

Even one skilled in the art might expend a great deal of time in experimentation to render actual working code to address these initial hurdles. Once the divisions in which the new elements to appear have been structured by the code encompassed by the present invention, the contents of the divisions may be easily loaded to give those divisions whatever properties or features one might add to any other web page. For all these reasons, disclosed herein is an actual working implementation of the javascript implementation code, with a complete listing of the source code as CODE 1 and CODE 2. From the supplied code one skilled in the art would be able to morph this specific embodiment of the invention into other graphic structures and variations limited only by their own imagination.

The programming language in this example is a combination of javascript and Flash 5 animation, though one skilled in the art might emulate the essential features of this invention with other programming languages now or in the future. When creating new divisions to appear on a web page already containing other unknown code, a flash animation was selected as the preferred container for the other text and image elements. Flash animations can just as easily carry video and audio streams, in fact some websites are implemented exclusively as flash animations. Moreover, a flash animation in a <div> or <layer> html tag structure can be made to appear on top of any other elements on a web page so as not to be inadvertently obscured. One skilled in the art might also have selected a java applet for this purpose, as disclosed herein and the referenced computer program listing appendix on CD-ROM, but because java applets can delay page loading in some systems, this was not considered the preferred implementation.

Javascript Code

All that is required in this example is replacement of the URL references which begin "http://", found in lines 2, 4, and 6 of portalbutton.htm (CODE 1), lines 8-10 of id.js (CODE 2), a sample computer code file according to the teachings of these claims, with references to valid working web pages and web accessible images and files. The id variable on line 14 of CODE 2 is set to match the labels on the <img> element in line 3 of CODE 1 In this example, the "src" image file on line 4 of CODE 1 is what is referred to in the claims as the first visible image. Width and height dimensions to match the corresponding images are entered in line 6 of CODE 1, lines 5, 6 and 12 of CODE 2 and text copy for the first text link can be entered on line 7 of CODE 2. Additional like parameters can be hard encoded into the Flash animation as will be demonstrated below in the discussion of the programming of that section.

The method of this invention employs a web page division (hereinafter the "Portal Array") to contain its various graphic, text and control elements 504, 506, 508, and 510, as seen in one example in FIG. 5. Consistent with the terminology of the claims, the Portal Array will act as a shell for the secondary visible elements as claimed. Divisions are subwindow containers which may be placed in either absolute position in relation to the window itself, or in relative position to some other window component or element. In the Netscape 4 series of browsers they are defined as a series of "layers" with very different properties and syntax with regard to the way the javascript code must be written. The code reproduced herein works and was tested on a wide variety of web browsers including Internet Explorer 5.5 and 6.1, Netscape 4.08, 4.76 and 6.2, Mozilla 1.3, for the PC and Netscape 4.7 for Macintosh and other later versions of these same programs. The html block of CODE 1 can be placed in any other web page table, subdivision or frameset configuration in any position and perform accurately as long as the window frame is large enough for the dimensions of the Portal Array.

In one preferred embodiment of the present invention the Portal Array is initiated in a non-visible state and is caused to appear upon mouseover of the first visible image button (hereinafter the "Portal Button") defined by line 2 of CODE 1. It should be noted at the outset that the current invention would have equivalent utility if the initial mouseover element were a text link only, and this alternative is also disclosed as an alternative embodiment. FIG. 5 is a screen representation which shows a typical appearance of the graphic button type of the invention in the mouseover state. The rectangle 502 containing the image which reads "the PORTAL BUTTON" is the Portal Button. The larger rectangle is the Portal Array, containing in this embodiment two text links, 504 and 508, and two banner type image links, 506 and 510.

This particular embodiment begins to illustrate the wide variety of innovative and novel marketing methods which are enabled by the technology of the present invention, which are expressly anticipated. The first text line 504 and first banner link 506 can be sold to the same or different advertisers. In this particular implementation one intention is to recruit advertisers with the second text link 508, offering them use of the technology for buttons they are submitting on their own to other sites. They might be doing this with other websites on either on a link exchange or else a paid by the advertiser basis. For helping to propagate the invention the advertiser benefits from having a dramatic special effect to increase the prominence of his advertising. Further incentive in this example is given by an offer to share income which might be derived from traffic through the second banner link 510. Many other such anticipated contractual relationships and methods will be discussed in the section on marketing methods which follows the explanation of the workings of the sample code disclosed.

Additional array sets or subsets could easily be defined by one skilled in the art. That is, the current demonstration shows an implementation of the invention with one sub-level, but a mouseover of some area of the Portal Array could easily trigger the appearance of a secondary sub-level and so on, what we claim as nesting secondary visible elements. The file portalbutton.htm, while a functioning standalone html file in its own right, is intended to be used as a drop-in component. Another webmaster may simply use it as a component in laying out their own web page, as they would any freestanding graphic file, to be positioned in an absolute sense at their sole discretion.

The method of this invention includes a method to automatically detect the screen position of the drop-in module without foreknowledge of the web page layout, so that our own elements can be placed reliably in relation to each other by the invention's own code. In this way, elements created by this invention might appear in direct proximity to previously visible elements, so that the mouse can be made to mouseover from one to the other, maintaining the visibility of all, without triggering the mouseout event referred to above.

To detect the position in one preferred embodiment of the present invention the first visible element (502 in FIG. 5 and 304 in FIG. 3), an image button defined by in line 3 of CODE 1, is used as a sensor (hereinafter the "Portal Button"). A programmer skilled in the art might select other elements to use for the same purpose, graphical or not, using current syntax or program commands which might be created in the future, either in javascript or another programming language. However extensive experimentation demonstrated that an image element was an optimum sensing device. The <img> element containing a jpg or gif file as placed on a web page by the code of CODE 1. Another advantage of this method is that even primitive browsers will still display a functioning button even if they do not understand the other necessary javascript code.

In the case of a specific embodiment where the starting first visible element might be a line of text, a method is disclosed herein of placing a graphic image (which could be as small as 1×1 pixel, or a transparent gif) immediately adjacent to the line of text, and then using that to detect the relative position of the line of text. One complication encountered with any attempted method was that some browsers do not respond accurately to queries as to the window position of some elements until the entire page and all of its code has loaded (102 in FIG. 1). For this reason, in this demonstrated embodiment the code is written in full upon loading of the web page, but the initial sensing event is delayed by the call to the startPortal( ) function in line 60 of CODE 2.

The method of this invention uses unique names for each individual instance of the invention. One skilled in the art will notice that each data variable and function name is labeled with an consistent id designator to match the entry on line 14 of CODE 2. This convention extends to the naming of the CODE 2 file, and the id and name labels in line 3 of CODE 1. This is required so as to provide for the possibility of more than one independent instance of the invention on a particular web page. If one had control of what other code might appear on a particular web page where the present invention might be placed this might not be required. But the additional advantage of this method is that the invention can be placed anywhere without such concerns. For the current example, variable1 becomes variable1_id, javascript function1( ) becomes function1_id( ) and so on. Javascript variables are generally set for convenience of reference to be global (meaning to be defined to have one meaning within a web page structure). Any global variable names for one javascript section will be global and possibly conflict with any other independent javascript which resides on that page, even code intended to perform other functions or written by other authors if names match by coincidence.

The computer code file loaded from a control server as shown in FIG. 1 at step 104 first tests for the version of browser being used by the web page visitor in lines 1-3 of CODE 2. These tests allow the program to fork to different versions of code which will only be understood by that particular browser where necessary. This kind of logic testing is what gives web program code what is known as "cross-browser compatibility", akin to speaking French to the French people and so on. All the javascript data variables are then initialized in lines 5-44 of CODE 2.

The method of this invention determines the available window size in lines 46-57 of CODE 2. This will be used to compute the proportionate position of the button in relation to the window size to decide how to position the Portal Array on mouseover in relation to the Portal Button of this invention. The different document properties queried reflect the different syntaxes used by the various browser models for similar variables. All the code in lines 62-264 of CODE 2 are self-contained subroutines which will be skipped over unless called by some other program instruction line. In programming language a "call" is a transfer of control to a subroutine of program code which will execute and then return control to the "calling" program step to resume the program execution at that point where it diverged.

In this particular embodiment the Portal Array (308 in FIG. 3) is pre-loaded (106 in FIG. 1) off the screen (302 in FIG. 3) and then repositioned depending on the scrolling position of the web page. Another technique which might be used would be to set the visibility parameters of the Portal Array division to achieve the same effect. An early development version of the code of this invention used this alternative technique, then changing the visibility attribute of the division to make it appear and vanish. The presence of a style directive necessary to access this effect has been retained as a vestige in lines 86 and 93 of CODE 2 as it causes no ill effect if preset to the visible state. As noted above the actual position of the sensor element may not yet be available at this point in the program flow, but the full construction of the page must be defined for some arbitrary window position to initialize the program. This results from the fact that it is not always possible to add container elements after a web page has finished loading. In this case the dummy position of (X,Y) coordinates (0,−200) has been preset in lines 37-38 of CODE 2. This has the effect of making the division representing the loaded Portal Array not visible, as there is no provision for scrolling into negative numbers in a web browser.

In one preferred embodiment the Portal Array is loaded with a Flash animation in the division element which will contain it. This is done by calling the loadPortal2( ) function in lines 81-134 of CODE 2. which writes a <div> element, or a <layer> element in the case of Netscape 4 only, with a size equivalent to the Portal Array. At the same time in lines 97-125 of CODE 2 it writes as the contents of the division the code to initiate the Flash animation using nested <object> and <embed> elements, which is the recommended technique.

For Netscape 4 the <embed> element is written alone as the <object> element added nothing.

Although all the graphic contents of the Portal Array could have been created entirely by writing simple html <img> elements with javascript there was a potential conflict if the Portal Button were to be placed in overlapping proximity on a web page to certain other elements. The z-Index is set with a relatively high number with the intention of causing the Portal Array to appear on top of any adjacent page elements. However, input form fields on some browsers, other Flash animations and other page components of the "object" type may obscure any graphics written in ordinary divisions with javascript only, so that the Portal Array might be caused to appear tucked behind them. By making the Portal Array contents from some kind of similar object element the problem could be minimized.

One skilled in the art might use some other kind of object element to achieve the same effect. A full realized java applet implementation is demonstrated as an alternative, but the Flash animation was chosen as a preferred method for a number of reasons. First, while java applets also have broad cross-browser compatibility, they tend the slow down the loading of a page. This is fine if you are the webmaster, you are writing your own page and that is the way you want to achieve your effect. However, the present invention is intended for the broader purpose of a small piece of drop in code that may be submitted to other websites for inclusion on their third party web pages. Any significant delay created by the presence of an instance of this invention beyond the overhead of loading its own graphics would be an impediment to its propagation in the market. Flash animations of small size, as here, load quickly and the typical web page visitor has already downloaded and installed the necessary Macromedia Flash plug-in software as it is now encountered everywhere.

Second, making the Portal Array itself a Flash animation facilitates the incorporation of flash banners, which many sites now have created for their own use. One of the desired goals of the present invention was maximum practical cross-browser compatibility with the ability to include external elements by reference without having to compile a new Portal Array code file for each instance of the primary invention itself. The latest Flash animation plugins do allow the incorporation of external graphic elements like jpg files by direct external reference, but the installed base includes a percentage of browsers which do not. In balancing the factors, it is easier to convert jpg and gif files to a swf format movie file where necessary rather than the other way around.

The method of this invention determines the position of the Portal Button on the page where it has been placed by making a delayed call (110 in FIG. 1) from line 60 of CODE 2 to the startPortal( ) function in lines 62-79 of CODE 2. By incorporating an approximately 100 msec delay the position of the page elements should now be available, though the delay time may be adjusted as necessary and its exact value is not especially critical. This routine uses the "id" attribute of the <img> element to reference and the query its true position in the window, using the appropriate syntax disclosed herein to obtain this information. With the actual position now in hand the startPortal( ) function now calls the checkScroll( ) function in lines 222-225 of CODE 2, to calculate the optimum position for appearance of the Portal Array when called. The checkScroll function itself calls the getScroll( ) function in lines 201-220 of CODE 2. to check the scrolling offsets and then the setPortal( ) function in lines 131-161 of CODE 2 to do the ultimate calculations. In another implementation the initial position checks and calculations could have waited until the first mouseover event.

The getScroll( ) function allows us to determine the relative real visible position of the button within the displayable page. Even in the initial loading process this is not a superfluous action, for although most web pages initialize with no scrolling in effect this is not always the case. Scrolling is a function which allows the contents of a web page to be shifted within a window which is smaller than its own physical size. Once a browser window is loaded, if the contents are larger in gross pixel dimensions that available window space scrolling bars appear on the right and bottom margins of a window, unless otherwise suppressed by the web page code. This allows a visitor to shift the contents of the window within its visible boundaries and this must be known to properly place the Portal Array. For example, if the window was scrolled so that the Portal Button were at the very top of the window, we would not want the Portal Array on mouseover to appear above the Portal Button, for then the Portal Array would not be visible on screen at all. Here the concerns are the same as for the question of initial placement.

The setPortal( ) function determines the optimum contiguous position for the Portal Array dependent on the window position of the Portal Button. If the Portal Button position is close to the top of the visible window we will want the Portal Array to appear directly below, corresponding to a vertical offset of the equivalent of the Portal Button height to achieve abutment of the rectangles. If the Portal Button is closer to the bottom of the window area, we would want the Portal Array to appear above it rather than below. To place the Portal Array above the Portal Button requires a negative offset of the height of the Portal Array itself to achieve the same effect. Similarly in lines 148-156 of CODE 2 the horizontal offset variable is calculated so as to center in the particular implementation the Portal Array (which is 475 pixels wide in this particular case) as much as possible while still maintaining a horizontal overlap of one half the width of the Portal Button. These settings may be easily varied according to taste by altering the mathematical calculations in this section. The window positions of the four corners of the calculated desired Portal Array position are then saved. These settings are intended to preserve a facile transition of the mouse from the Portal Button area to the Portal Array area.

Figure 3:
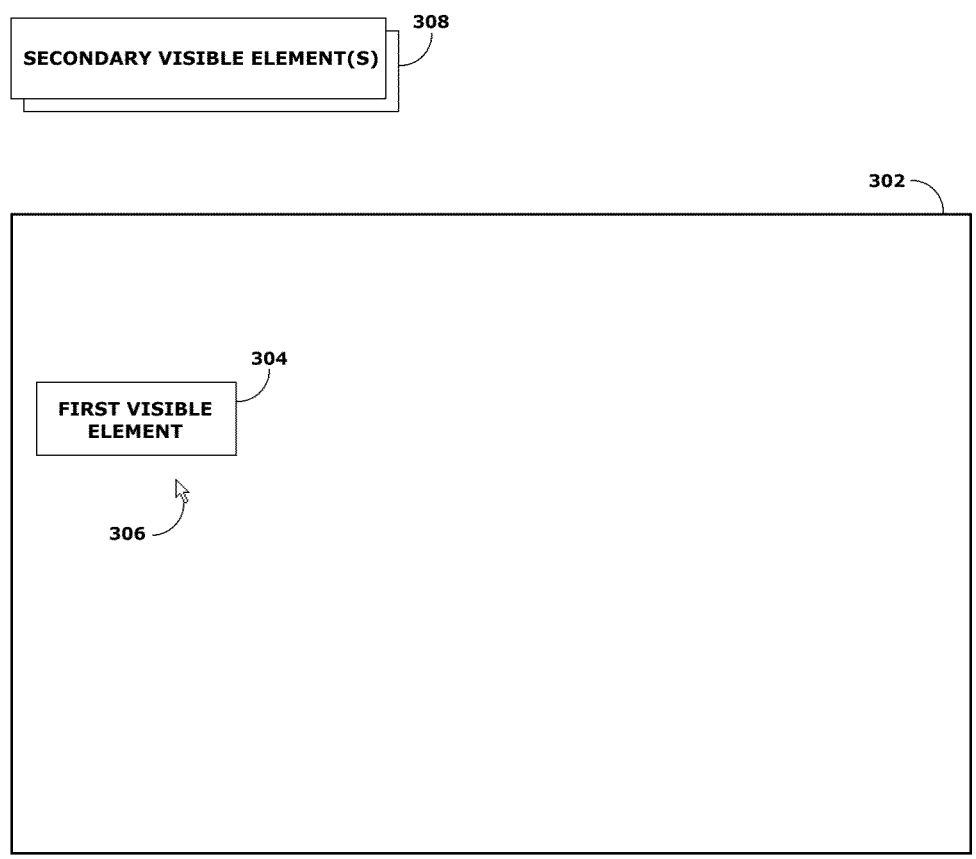
FIG. 3 is a simplified screen shot of an arbitrary placement of the present invention on an internet web page, in its unactivated state where in a specific embodiment the secondary visible image(s) to be displayed upon activation are not seen because they are positioned off screen.

The method of this invention includes a means to monitor the mouse position (108 in FIG. 1 and 306 in FIG. 3). After completion of the execution of the above called functions the program initialization jumps to lines 266-275 which starts the monitoring function. This is active in the background at all times and will be used below to determine whether the mouse is still over either the Portal Button or the Portal Array (114 in FIG. 1) once the initial mouseover causes it to appear.

In one preferred embodiment the method of this invention includes a function to monitor for a mouse click event in lines 277-282 of CODE 2. If a click is detected the monitoring function calls the hideMe( ) function directly in lines 227-242 of CODE 2, which moves the Portal Array back to its initial off screen position (308 in FIG. 3). This is a optional failsafe measure which will close the Portal Array if the visitor clicks anywhere else. At this point the initialization of the program is complete as all the program steps in the start sequence have been completed.

Figure 4:
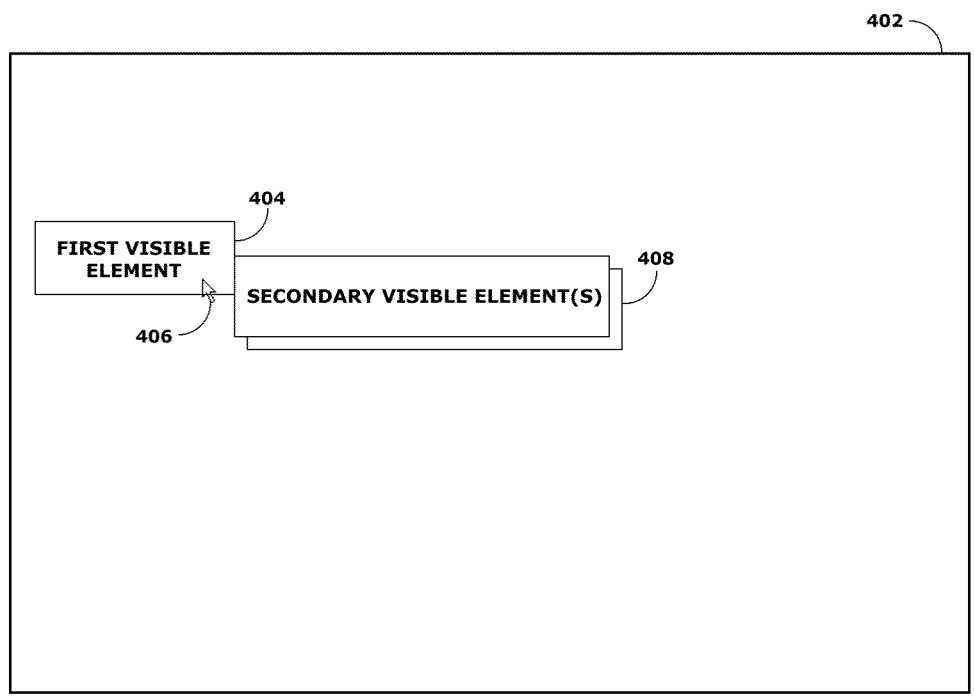
FIG. 4 is a simplified screen shot where a computer pointing device has moved over the first visible part of the present invention as previously seen in FIG. 3, activating it and causing the additional secondary visible part(s) to appear in accordance with a specific embodiment.

Though the Portal Array is still not visible, the code is fully armed and waiting for a mouseover event on the Portal Button to trigger further activity. Since there is already a separate monitoring function for mouse position running in the background, one might ask why not simply use this to signal a mouseover event? One skilled in the art might indeed write such a variation, but the approach demonstrated here simplifies the code in this implementation and makes the trigger event easier to observe directly for debugging purposes. The mouseover causes the execution of the mOver2( ) function in lines 244-249 of CODE 2 which sets a flag marker to signal that the Portal Array is visible and clears any lingering timeouts set for closing action. Just before actually displaying the Portal Array, the mOver2( ) routine checks the scroll position again through the checkScroll( ) function (110 in FIG. 1). Then the showMe( ) function is called in lines 251-264 which moves the division containing the Portal Array to the calculated optimum position causing it to be visible (112 in FIG. 1 and 408 in FIG. 4). This apparent action is instantaneous in practice.

The method of this invention in this embodiment determines when a mouseout event should take place by comparing the position of the mouse to the window areas of the Portal Button and the Portal Array. The Portal Array should remain visible when the mouse is over either. The mouse position monitoring routine (114 in FIG. 1) which was initialized in lines 266-275 of CODE 2 calls the followMouse( ) function in lines 164-199 as necessary. After determining the mouse position this routine compares it to the areas of the two rectangles (based on coordinates of their four corners) representing the Portal Button (404 in FIG. 4) and the Portal Array (408 in FIG. 4) to determine when the mouse (406 in FIG. 4) has left one of those two areas. There is a cushion space of 5 pixels around these areas to minimize false closings, though this number can be adjusted to taste. There is also a brief time delay built into the call to the hideMe( ) routine from line 189 of CODE 2. This allows the hiding call (116 in FIG. 1) to be canceled if the mouse should reenter the areas of the rectangles. Thus the mouse can move diagonally between the Portal Array and the Portal Button, crossing the exterior screen area at a reasonable pace, without causing an unwanted mouseout event.

By using an "are we outside the box" test rather than a "did we just leave the box" test, we solve and tricky technical problem. When the mouse is over the Flash animation in the division, some browsers do not accurately register mouseout events, otherwise one might include such a function associated with the division element which contains it. Flash animations have a "talk to javascript" feature, but can it suffer from browser compatibility problems so the simplicity of our approach maximizes browser success. One skilled in the art might nonetheless to choose any of a multitude of mouse event detection techniques.

The method of this invention in one preferred embodiment uses a query string appended to the name of the Flash animation to pass predetermined values for the various text and graphic elements and their links to be self-incorporated by the animation startup routine. Each of the variables to be set appears as a variable "name=value" pair, immediately following the "?" of the name of the Flash animation to be load. The variable/value pairs are joined together with "&" characters as seen on lines 101-102 and 108-109 of CODE 2. When the Flash animation starts up these values are read directly as assigned values to like named variables in the root level of the Flash movie. One skilled in the art might use other methods of communication between the two code languages, but this is the appears to be the most simple and therefore to be deemed optimum.

A Flash Animation Example

Figure 5:
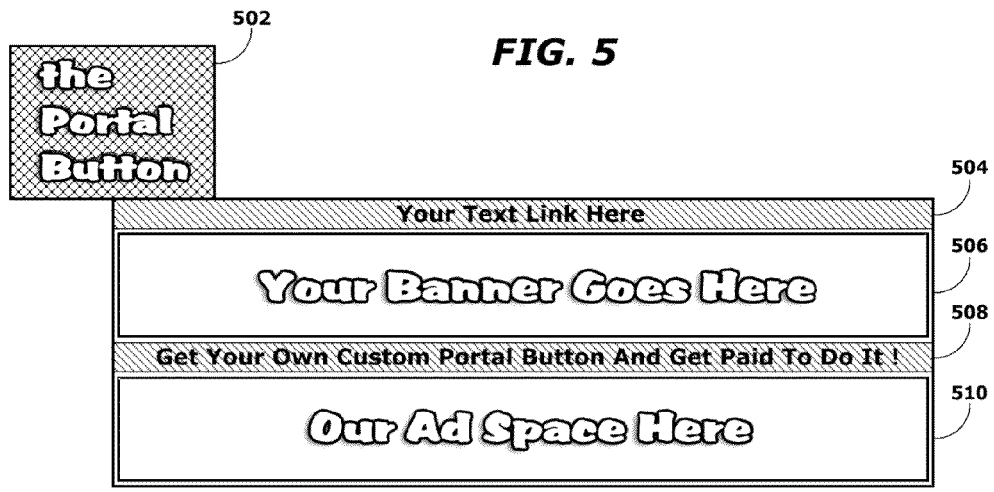
FIG. 5 is a screen representation of the appearance of a particular embodiment of the present invention in its activated state.

A description of the preparation of the main Flash animation in this particular example will perforce include some references to specific design elements, so they are included to allow a person skilled in the art to quickly reproduce the implementation demonstrated above, as represented by FIG. 5. First four new button symbols were created using "Insert->New Symbol" from the Flash program menu bar. All four buttons were set to behave as "Button" in the "Symbol Properties" box as they were created and named, for sake of reference as "TextButton1", "TextButton2", "Banner1" and "Banner2". Three "Movie Clips" were also created as new symbols using the same function, named "portal", "Pic1" and "Pic2". The graphics for the banners will be loaded into these last two clips as independent Flash movie elements, which can be referenced over the web by URL.

Figure 6:
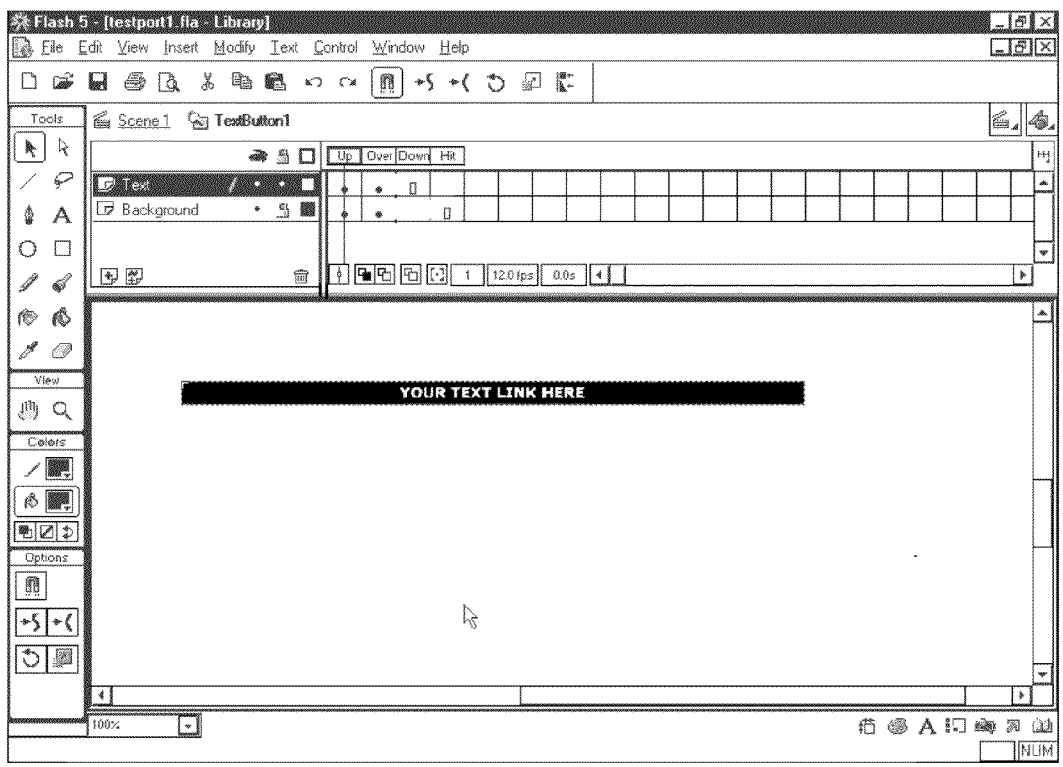
FIG. 6 is a screen shot of the configuration of a text link for the flash animation in one specific embodiment of the present invention in one embodiment.

An experienced Flash programmer will now have the symbols available for editing through the "Movie->Library" menu function which opens the Library box. Double clicking on any symbol makes it available for editing on the main program screen area (known as the "stage"). For TextButton2 a new key frame was created in the "Over" position extending through to the "Hit" position (FIG. 6). A filled colored rectangle was placed in the "Up" key frame, using the "Rectangle Tool" in the "Tools" bar, sized here to 474 by 17 pixels. To effect a color change on mouse rollover another rectangle of the same size but different color was placed in the "Over" frame. A secondary layer was created above the first with the same key frame setup. In the "Up" key frame of the secondary layer a text field was added using the "Text Tool" on the "Tools" bar. The final frame configuration is consistent with FIG. 5. The text field was named "text1" 504 in the "Windows->Panels->Text Options" box and at the same time set to "Dynamic Text" and the "Selectable" box was unchecked. Font, color and size attributes were selected in the "Windows->Panels->Character" box. To effect a color change also of text on mouseover, an identically named text field was added to the "Over" frame with different color attributes. TextButton2 508 was elaborated the same way with the addition of a actual text contents in the text fields so as to hard set the text copy. In this latter case, naming the field and the use of the dynamic text option are not required.

For the Banner1 506 and Banner2 510 buttons background color elements were set the same way as for the text buttons in this case in the size of 474 by 66 pixels. This was assuming banners of a size 468 by 60 pixels allowing for a moderate border around each. In the secondary layer of the Banner1 button the Pic1 movie was placed in a centered position by dragging it from the Library, requiring only a single key frame extending for the "Up", "Over" and "Down" frames. The Banner2 button was made in the same way.

Figure 7:
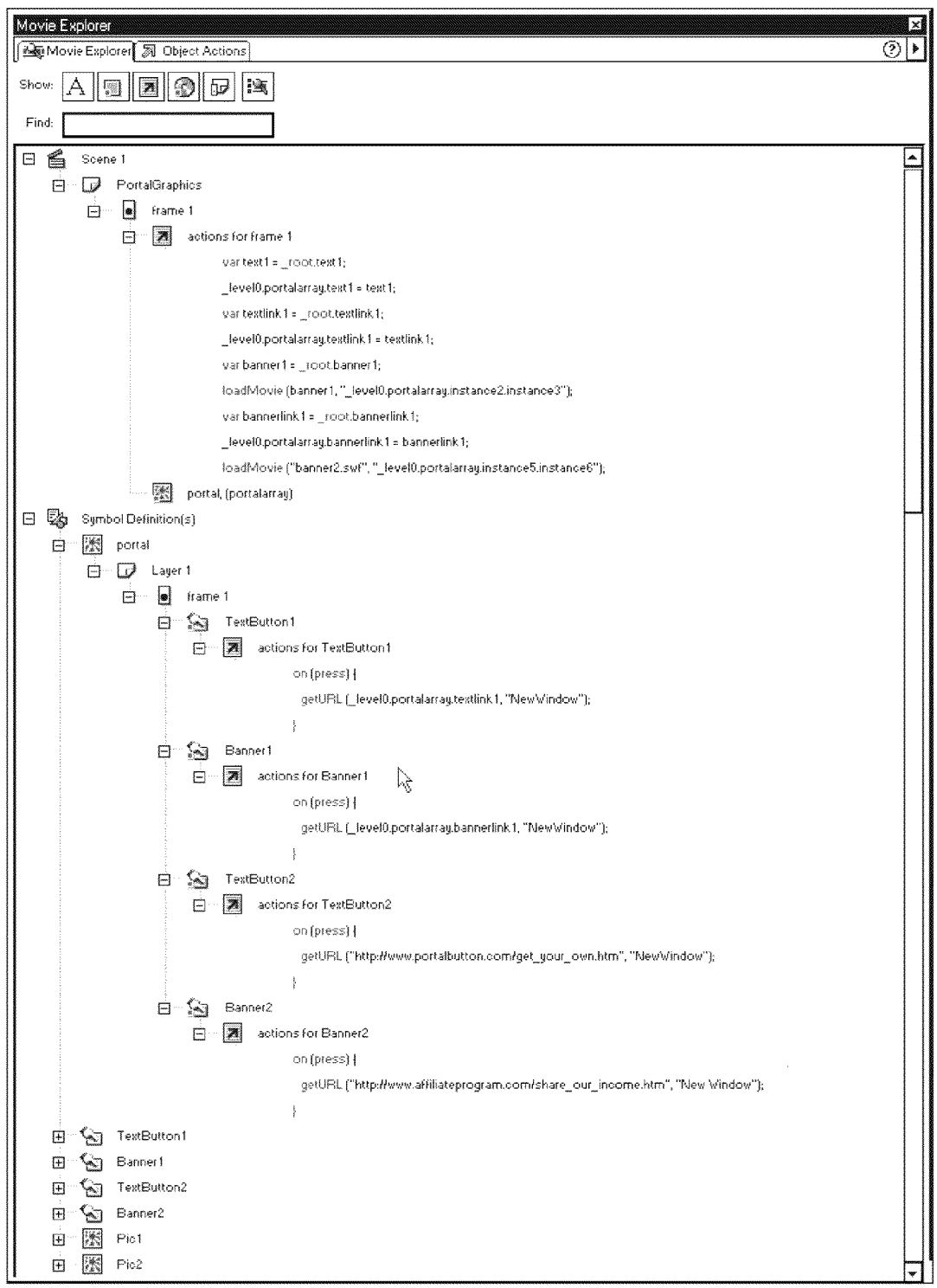
FIG. 7 is a screen shot of the details of the actionscript properties of a flash animation in one specific embodiment of the present invention.

The portal movie was now opened on the stage and the four buttons were placed within it by dragging them from the Library. They were positioned according to their (X,Y) coordinates as follows, text1 (0,0), banner1 (0,17), text2 (0,83), Banner2 (0,100). Two additional dynamic text fields were added to the portal movie to serve as holding fields for the two URL links to be loaded by the passing of variables. These two fields were named textlink1 and bannerlink1. As shown in the partially expanded finished "Movie Explorer" in FIG. 7, actionscripts were added for each button of the form:

```
on (press) {
    getURL (URL, "NewWindow")
}
```

For this particular embodiment the URL references for textlink2 and bannerlink2 were hard encoded into the animation itself, though these could have been made based on additional dynamic text fields at this same level. As shown in the Movie Explorer expansion FIG. 7, it was possible to give absolute path names for the URLs within this particular Flash animation based on the assigned instance and dynamic text field names, for example, "level0.portalarray.textlink".

Finally the portal movie itself was placed in the first key frame of Scene 1 of the main movie stage. It was given the instance name of "portalarray" in the "Windows->Panels->Instance" box, matching the references in the URL fields of the TextButton1 and Banner1 button actionscripts. An actionscript was also added to this same frame. In this script the variables passed in from the Portal Array javascript code are read into the dynamic text fields which load the respective text and URL links as can be seen more specifically in the Movie Explorer expansion in FIG. 7. The two Flash animations for the picture banners are loaded as movies, one from a passed variable, the other hard encoded. One skilled in the art will observe that the reference paths to the banner swf files include instance numbers. This was done because despite valiant attempts to assign names to all instances, they would never show up under the "Debug->List Objects" function when the movie was tested, presumably a bug in the Flash 5 program itself. In any case, in the finished movie, stable instance numbers can be derived from the "List Objects" function for internal use.

The movie finished size in this case was set to 475 by 167 pixels with the "Modify->Movie" menu function access the "Movie Properties" box. There was an extra pixel added in both dimensions to compensate for an inherent Flash border rendering bug. The method of this invention includes the use of alternative size Flash animations. Even assuming the width of the Portal Array were set based on the nearly standardized 468 pixel width, what if one wanted to accommodate various height banners in the Banner1 position? One would only have to maintain an inventory of main Flash animations precompiled in one pixel steps to cover a range between 60 and about 100 pixels to cover all bases, as all the rest of the parameters can be loaded in dynamically. Here a version providing for a 60 pixel banner in Banner1 was saved as testport1.fla, which was compiled by the Flash 5 program to the working Portal Array graphic, testport1.swf, referred to in lines 101 and 108 of CODE 2.

A Java Applet Example

An alternative method of this invention already mentioned uses a java applet as the Portal Array contents, though this is not the most preferred implementation based on the reasons already given and is presented for completeness and instruction. While this version was also tested as working on a variety of browsers, the most recent java runtime environment packages are very much larger than their predecessors and take correspondingly longer to load. This may cause overhead problems on certain machines with limited resources, which would certainly show up in other situations before a Portal Button were ever encountered, but which also represents a risk factor in general release. In this case it is shown how to duplicate the structure of the previous example.

Use of the java applet is a simple matter of substituting the code in CODE 4 in the Appendix CD-ROM for lines 97-132 of CODE 2. Here the banner graphics can be URL references to simple jpg and gif files, though the java security "sandbox" imposes a limitation that they reside on the same server domain as the applet itself. There is no such security restriction for the Flash animation version, which can pull in and incorporate swf movies files from anywhere on the web.

Here again it is demonstrated how it is possible to pass the values of variables related to the graphic elements to the constructors built into the applet code. This allows a single compiled applet file to be used for multiple instances of the invention, even on the same page. Although any or all of the graphic parameters could have been so passed, the example herein also shows how some of these variables can be hard encoded into the applet itself to avoid tampering with links which are intended to remain associated with a Portal Button. The ".java" file reproduced in the text of CODE 3 is the source code which is processed by a Java compiler to produce the actual binary executable file PortalButtonApplet.class which is referenced by the javascript code. Lines 1-5 of CODE 3 simply tell the compiler what source code packages it will need to compile the java file.

The method of this invention includes a listening function to determine when mouse events take place interior to the applet, sets up the layout environment and loads in the graphic parameter variables in lines 7-35 of CODE 3. Lines 37-56 of CODE 3 load in the images themselves in such a way that the program can determine that the images are in fact available from the web server.

The method of one alternative implementation includes a mechanism for multiple options within the Portal Array, congruent with the previous example. This allows one single Portal Button to be a branching out point for multiple sites. Indeed each area of the Portal Array could be sold individually to a different advertiser if desired. As with the Flash version, four areas are demonstrated here, two text links and two full banner size image buttons. Lines 58-149 create the graphic area. For each sub-rectangular area of the Portal Array, the program allots an area of space in the chosen layout by calling the Portal Button "class" function which comprises lines 175-273 of CODE 3. One dimension parameter, the height of the secondary area, an image areas is left dynamic. Both the size of the division containing the applet and the size of the applet itself are set automatically as this is transmitted through the program in lines 12, 13, 85, 92, 100 and 113 of CODE 2 and lines 25, 79 and 88 of CODE 3.

In one preferred embodiment the method of this invention includes a feature to change the color of the areas of the Portal Array when a mouseover occurs in their local area, and the ability to click on those areas to lead to the web pages designated by the associated web page links. These actions are controlled from lines 151-166 of CODE 3 which respond to any relevant mouse events. Changing the setting of the buttonState label and commanding a repaint( ) function causes the replacement of the graphic of the area with an new image with the new parameters of color, etc.

To smooth the visual transition an optimum technique is to implement a double buffering mechanism in lines 218-273 of CODE 3. Simply put, the program substitutes a new function paint2( ) for the normal inherent function in the Java toolkit which is paint( ) and then associates the update( ) function with paint2( ) instead. The new paint2( ) routine then functions to create a graphic buffer by calling resetBuffer( ) in lines 256-271 of CODE 3, and then preloads the new graphic image into computer memory using the original paint( ) function modified in lines 222-246 of CODE 3. In this way the images and text corresponding to the new image can be assembled whenever the computer has available time. Then the finished image can be loaded onto the computer screen with a minimum of flicker. One skilled in the art could easily modify these style definitions or add additional style parameters affecting changes in background image, text decoration such as underlining, font appearance or any of a multitude of other available appearance elements according to taste.

Other Technical Issues

On infrequent occasions a Portal Button might be placed in a window container smaller than the Portal Array it would display. In this case no amount of object based code would allow for full visibility. This might occur in the context of a web page broken into multiple small frames, a situation easily detected by lines 46-57 of CODE 2. Generally such narrow frames are used only for features like navigation bars and the like, but they might contain buttons of an advertising nature. If one wished to provide specifically for such a case the anticipated solution in another embodiment would be a pop-up window option which would launch only if the size of the window were determined to be too small. In this case one skilled in the art could "walk up the hierarchy" to get the absolute screen position of a the sensor element within a frame with javascript code in such form as

```
function GetAbsScreenLeft (pageElementID) {
    var absLeft=el.offsetLeft;
    while ((pageElementID=pageElementID.offsetParent) !=null) {
        absLeft += pageElementID.offsetLeft;
    }
    return absLeft;
}
```

Using a method derived from this technique, in a further alternative mode position offsets would be determined so that a pop-up window could be opened up directly adjacent to the Portal Button. Under Internet Explorer the window could be made borderless by including the directive "fullscreen" in the javascript window.open( ) function and the window could be resized at once to the desired size. Any image on an html page contained in that pop-up could easily generate a mouseout event that the parent window could track to close that pop-up window in a similar fashion demonstrated here. Inter-window communications in javascript are permitted where an opener (parent) window and its child are involved.

The drawbacks to such an approach are of course the bad reputation that pop-up windows already have (though a self-closing method might placate that) plus the distracting flashing and delays associated with window opening. In essence, for smooth operation the pop-up would have to be opened on page loading where deemed necessary, and then hidden with a window.blur( ) event which moves a window to the screen desktop background. All this would entail adding the bulk of a great deal of extra computer code to every instance of the invention. It might be not be an undue burden by comparison to simply ask recipient webmasters to place one's portal button on pages large enough to contain the Portal Array also when visible, but otherwise without any other restrictions.

While great lengths have been traversed to support in the code herein the widest spectrum of browsers possible there is always an outer fringe of compatibility. The Netscape 4 family with its outmoded layers syntax presents special problems and has numerous bugs which are the responsibility of its own original programmers. Many major sites no longer support Netscape 4 at all resulting in program crashes or malformed graphics if you visit their web pages using a browser from that series. The inherent problems of the layers model, though innovative at the time, explains why the entire approach was abandoned in the jump to Netscape 6. The Portal Button as presented here works reliably upon initial page loading using a Netscape 4 browser. However, if one attempts to "reload" the same page in Netscape 4, the Flash animation may fail to load the second time. In our experiments a subsequent reload reverses the fault, exhibiting a toggling behavior.

An inordinate amount of time was dedicated to finding a fix for this odd bug, which does not affect the java applet variation. We adjusted the timing of the loading parameters of the Portal Array in a multitude of ways. We attempted to have the Flash animation signal to the javascript its loading state, which may be done by using a "javascriptfunction( )" entry as the target URL of a Flash getURL( ) command. By flagging this signal we had hoped to have the javascript reload the contents of the Portal Array division if it detected a Flash animation load failure within a preset time frame, with a setTimeout( ) to a javascript function call. Assuming a load failure, the contents of a layer may be swapped out after initial page load with code of the form:

```
document.layers.layername.document.open( );
document.layers.layername.document.write(contents);
document.layers.layername.document.close( );
```

This approach nearly worked. In fact, on two different machines both running the same Netscape 4.08 software (but otherwise under two different Windows operating systems) the problem was cured on one machine but most surprisingly not the other. Ultimately we decided to leave well enough alone rather than add so much additional code chasing down a minor bug in a browser series soon to be extinct anyway in practical usage. It is unlikely that a web page visitor would reload a page unless it did not load properly the first time. Here the first load does not seem to be the problem. Moreover the worst case scenario is simply that the Portal Array itself would not appear in a vanishingly small minority of cases, deprecating to a normal button which would still work as a normal URL link from the garden variety href element in line 2 of CODE 1. Even more primitive browsers will deprecate in the same way, another advantage of basing the initial appearance of the Portal Button on a simple <img> element which can always be depended on.

Marketing Methods

As has already been shown in just the one specific configurational example of elements above the present invention enables marketing methods which could not be effected or known otherwise. Though equally applicable to better serve to a single advertiser, single website system, the potential is expressly envisioned to create all manner of multiple advertiser, multiple website cooperative relationships. While most of the foregoing discussion centered on the technical aspects of optimum implementation of the technology, with reference to certain preferred versions thereof, it must be recognized that many other marketing models are possible. The following examples are intended to suggest the breadth of such possibilities, but the spirit and scope of the appended claims should not be limited to the description of the sample preferred versions described herein.

The method of this invention includes a method of self-propagation. The URL link for TextButton2 of the Flash animation and line 17 of CODE 3 are references to a site where someone 206 who encounters a Portal Button in the wild may get one for their own use through the agency entity 202. A website has been configured to provide ready to submit implementations of the invention to anyone who wants one and who will abide by the license and usage terms to be specified there. It is hoped that this unique and ground breaking effect will attract interest from those who see it to want one of their own. Each instance of the invention that is licensed may carry a link back to its own generator with the potential for exponential growth.

Figure 2:
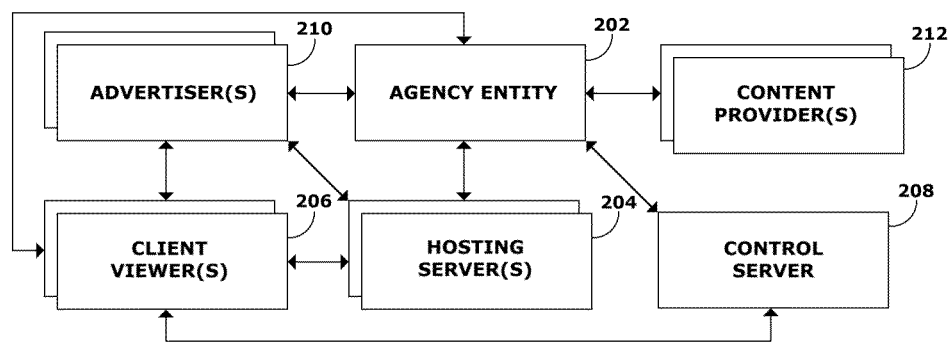
FIG. 2 is a block diagram of the relationships and contacts which the present invention encompasses in accordance with a specific embodiment.

There are at least three other potential marketing models to propagate the present invention throughout cyberspace. The income from the incorporated available expanding advertising space might be used by the agency entity (202 in FIG. 2) to buy advertising space on other hosting servers 204 with a share of that money. This would be an electronic billboard company model. The agency entity 202 controls a pool of cyber adspace and can build a large conglomerate audience attractive to an advertiser 210. Here the agency entity 202 collects money from the advertisers 210 and uses in to finance instances of the invention.

In another innovative implementation, the present invention might be offered as a value added resource to other websites 204 For example, one might include either audio, video, or other content built into an embodiment of the present invention. In this way, another webmaster might pay to post instances of the invention by virtue of the services provided therein, an internet radio station, news and wire service features, or any other service that a person would pay for in visiting a website. A smaller website might not have the resources to pull together such content on their own, but the present invention may act as a website within a website in such a case. In this model, the hosting entity 204 pays the agency entity 202 (or at least does not charge them) for placing instances of the invention. The agency 202 then finances the cost of content provided 212 from advertising revenues. In the case of a music entertainment company, they might provide the content for free in exchange for link backs from the client viewers 206, which would be as in a music promotion model.

Placing instances of the invention on many other websites 204 will create virtual portal websites. One skilled in the art of marketing will instantaneously recognize that this technology empowers the creation of conglomerate networks which transcend the limitations of the audience of any one particular website with an audience competitive with the largest single ventures.

The present invention also lends itself to niche sites, for example a resource center for posting on car enthusiast sites, political action committees, sites specific to a particular geographic area, entertainment guides, to give just a couple wide ranging examples. Instead of being concerned about drawing individual visitors to one's own particular website in the first instance, the present invention reframes the whole concept of the internet according to its underlying networking potential. One need only create an attractive module package and there is a model expressly anticipated herein to propagate it.

The method of this invention includes a potential income sharing feature. The URL link for Banner2 510 shown in FIG. 5 and line 21 of CODE 3 are links sample links to a generic affiliate program. This could be set up to provide that any traffic traceable to a particular source will pay out a share of income that traffic generates to the source of the traffic. In this case an instance of the invention would provide that for every person who uses one, they will also receive income from participation in the affiliate program. In other words, the extra page space created by the present invention may used not only by the person who would like to take advantage of its unique and novel features, but also by the inventor to generate income. Allowing for a share of this income from the agency entity 202 to go back to the advertiser licensees 210 of the invention is an additional incentive to have them participate in the program. In this way, the licensor of the Portal Button need not solicit for space on other websites 204, the advertisers 210 will do it for him.

The method of this invention includes a method for instant real time updating of instances of the invention on web pages at any time. This unique feature derives from the fact that all the data for creation of an instance of the invention is delivered on the fly to the client viewer as requested when they download the computer code file of javascript CODE 2 from the control server. This means that the entire array can be changed in any respect, including the configuration of the graphics and links they point to by updating the source code at the server where computer code file resides 208. This promises an immense saving of labor, as the present invention can act as a submit once, update at will system.

The method of this invention includes a method of selling advertising space to third parties. It is anticipated that many will want to employ the methods of the present invention in some other visual design configuration than the specific example shown here, which may possibly not include an outside party graphic. Some advertisers 210 will want to purchase from the agency entity 202 the new advertising space, graphic or not, created by this invention as it is deployed on web pages throughout cyberspace. A license may provide that other banners for other businesses will appear on your licensed version at the same time that your banner may appear on other implementations in use for an additional fee. It could be provided that these would be perhaps related but non-competitive businesses.

Taking into account all these possible variations of visual format, the entire piggyback advertising space available in the virtual cyberspace can be treated as a commodity like billboard space as previously suggested, again taking advantage of the instant update capability. In this model the placements on hosting servers 204 would be financed by the licensees 210. This licensor controlled advertising space might be a minor component of each implementation licensed, limited to a single one of the text links, and still have enormous commercial value. For example, some insurance company might very much like every implementation of this technology in the world to carry a text link reading "Click Here To Save Money On Your Car Insurance".

The method of this invention includes a password based system for implementation management. The id numbers already built into the system to prevent intra page conflicts can also be used to control updating services 208. Clearly one would like to restrict access to the ability to change the parameters of already installed implementations as just discussed. It is intended that each person who desires to use this technology should choose have an option to a password which would be required to change the computer code file associated with that id number. Even links from the first visible element itself might be made flexible, for example by linking to a routing server with could redirect the hit from the client viewer 206 to another server specified by an advertiser 210 user at any time after installation on a particular web page.

Final Considerations

One skilled in the art of computer programming will endorse the proposition that the best way to teach is by working example, especially in the case of novel computer code. The reader's attention is directed to all papers and documents which are filed concurrently with this specification, and the contents of all such papers and documents are incorporated herein by reference, the intention being to as fully possible enable one to immediately grasp the special advantages of the present invention. All the features disclosed in this specification (including any accompanying claims, abstract, and drawings) may be replaced by alternative features serving the same, equivalent or similar purpose, unless expressly stated otherwise. Thus, it is expressly understood that each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims is not intended to invoke the provisions of 35 U.S.C. §112.

I respectfully claim:

1. A computer display advertising method, comprising:
   (a) placing a first visible element on a displayable page on at least one hosting server with a first predefined contractual relationship with an agency entity;
   (b) placing a computer code file on a control server with a secondary predefined contractual relationship with the agency entity;
   (c) making the hosting server and the control server accessible to a client viewer;
   (d) loading the computer code file upon loading of the displayable page on the screen of the client viewer;
   (e) in response to the interaction of a computer pointing device with the first visible element, and according to the specifications of the computer code file,
      (1) the client viewer, via the execution of the computer code file, detecting the actual position on the screen of the client viewer of the first visible element;
      (2) determining an optimized position for the secondary visible element, so that its display position is optimized in the horizontal direction on the screen of the client viewer, the method by which the optimized display position is determined comprising:
         (i) computing, with a processor, a first amount of space in the viewable area of the client viewer that is available to the left of the first visible element, and
         (ii) computing, with a processor, a second amount of space in the viewable area of the client viewer that is available to the right of the first visible area,
         (iii) comparing, with a processor, the size of said first amount of space and the size of said second amount of space,
         (iv) determining, with a processor, which one of said first amount of space and said second amount of space is the largest amount of space and
         (v) selecting, with a processor, said largest display space as said optimized position for said secondary visible element,
      (3) displaying, relative to the actual position on the screen of the client viewer of the first visible element, said secondary visible element in said optimized display position, the optimized display position providing for said secondary visible element to be directly proximate to the first visible element on the screen of the client viewer, taking into account any scrolling position offset within the screen of the client viewer of the displayable page;
   (f) having a link between at least one of the visible elements and at least one advertiser, the advertiser having a third predefined contractual relationship with the agency entity;
   (g) maintaining the appearance of the said secondary visible element while the computer pointing device maintains an interactive relationship with any of the said visible elements.

2. The method of claim 1 further comprising:
   (a) placing a position detectable element on the displayable page in a predefined position relative to the first visible element;
   (b) determining the position of the first visible element by relatively detecting the position of the position detectable element.

3. The method of claim 2 wherein the first visible element is a text element.

4. The method of claim 1 further comprising, obtaining other content accessible through one of the visible elements from at least one content provider based on a fourth predefined contractual relationship with the agency entity.

5. The method of claim 1 further comprising, placing the first visible element on multiple hosting servers.

6. The method of claim 1 wherein the secondary visible element is itself a nested instance of the invention.

7. The method of claim 1 wherein there are a plurality of secondary visible elements linked to a plurality of advertisers.

8. The method of claim 1 further comprising, assigning a unique id associated with each instance of the invention.

9. The method of claim 1 further comprising:
   (a) assigning at least one password to the advertiser;
   (b) enabling the advertiser to update any of the visible elements linked to the advertiser.

10. The method of claim 1 wherein one of the visible elements links to an offer to supply additional instances of the invention.

11. A computer display advertising method, comprising:
   (a) placing a first visible element on a displayable page on at least one hosting server with a first predefined contractual relationship with an agency entity;
   (b) placing a computer code file on a control server with a secondary predefined contractual relationship with the agency entity;
   (c) making the hosting server and the control server accessible to a client viewer;
   (d) loading the computer code file upon loading of the displayable page on the screen of the client viewer;
   (e) in response to the interaction of a computer pointing device with the first visible element, and according to the specifications of the computer code file,
      (1) the client viewer, via the execution of the computer code file, detecting the actual position on the screen of the client viewer of the first visible element;
      (2) determining, with a processor, an optimized position for the secondary visible element, so that its display position is optimized in the vertical direction on the screen of the client viewer, the method by which the optimized display position is determined comprising:
         (i) computing, with a processor, a first amount of space in the viewable area of the client viewer that is available above the first visible element, and(ii) computing a second amount of space in the viewable area of the client viewer that is available below the first visible area,
         (iii) comparing, with a processor, the size of said first amount of space and the size of said second amount of space,
         (iv) determining, with a processor, which one of said first amount of space and said second amount of space is the largest amount of space and
         (v) selecting, with a processor, said largest display space as said optimized position for said secondary visible element,
      (3) displaying, relative to the actual position on the screen of the client viewer of the first visible element, said secondary visible element in said optimized display position, the optimized display position providing for said secondary visible element to be directly proximate to the first visible element on the screen of the client viewer, taking into account any scrolling position offset within the screen of the client viewer of the displayable page;
   (f) having a link between at least one of the visible elements and at
   least one advertiser, the advertiser having a third predefined contractual relationship with the agency entity;

(g) maintaining the appearance of the said secondary visible element while the computer pointing device maintains an interactive relationship with any of the said visible elements.

12. The method of claim 11 further comprising:

(a) placing a position detectable element on the displayable page in a predefined position relative to the first visible element;

(b) determining the position of the first visible element by relatively detecting the position of the position detectable element.

13. The method of claim 12 wherein the first visible element is a text element.

14. The method of claim 11 further comprising, obtaining other content accessible through one of the visible elements from at least one content provider based on a fourth predefined contractual relationship with the agency entity.

15. The method of claim 11 further comprising, placing the first visible element on multiple hosting servers.

16. The method of claim 11 wherein the secondary visible element is itself a nested instance of the invention.

17. The method of claim 11 wherein there are a plurality of secondary visible elements linked to a plurality of advertisers.

18. The method of claim 11 further comprising, assigning a unique id associated with each instance of the invention.

19. The method of claim 11 further comprising:

(a) assigning at least one password to the advertiser;

(b) enabling the advertiser to update any of the visible elements linked to the advertiser.

20. The method of claim 11 wherein one of the visible elements links to an offer to supply additional instances of the invention.

\* \* \* \* \*